United States Patent

[11] 3,627,450

[72] Inventor Harold L. Ward
 Dunlap, Ill.
[21] Appl. No. 73,480
[22] Filed Sept. 18, 1970
[45] Patented Dec. 14, 1971
[73] Assignee Caterpillar Tractor Co.
 Peoria, Ill.

[54] FUEL CONTROL VALVE
 8 Claims, 2 Drawing Figs.
[52] U.S. Cl. ................................................ 417/205,
 417/307
[51] Int. Cl. ...................................................F04b 23/08,
 F04b 49/00
[50] Field of Search........................................ 417/244,
 199, 205, 206, 287, 288, 296, 307

[56] References Cited
 UNITED STATES PATENTS
2,672,817 3/1954 Friedlander.................. 417/205
3,363,574 1/1968 Aldinger...................... 417/307 X Primary Examiner—Robert M. Walker
Attorney—Fryer, Tjensvold, Feix, Phillips & Lempio ABSTRACT: A single, multipurpose valve is located between a transfer pump and a fuel injection pump in an engine fuel system for performing multiple functions. The valve includes a valve body having a cylindrical internal bore and a valve sleeve reciprocable within the bore between four different positions. Lands, grooves, a port and an inner wall of the valve sleeve are positioned with respect to openings in the valve body to permit the valve to be operated as a priming mechanism to permit bleeding of the system when filling, to function as a bypass in controlling system pressure during operation and to provide a continuously controlled air bleed during engine operation. The multipurpose valve reduces the number of separate valves required for proper functioning of the fuel system and simplifies checkout in the event of malfunctions in the fuel system.

PATENTED DEC 14 1971 3,627,450

INVENTORS
HAROLD L. WARD

BY
Fryer, Tjensvold, Feix, Phillips & Lempio
ATTORNEYS

3,627,450

FUEL CONTROL VALVE

BACKGROUND OF THE INVENTION

1. The Field of the Invention

The present invention relates to fuel systems for engines. The present invention relates particularly to a fuel system of the kind in which an engine driven transfer pump transfers fuel from a fuel tank to a fuel injection pump during engine operation and a hand priming pump is associated with the transfer pump to fill the system for startup.

2. Description of the Prior Art

Fuel systems for diesel engines commonly have a number of valves, having different functions, to ensure proper operation of the fuel system. The valves may consist of a bypass valve to control a predetermined pressure within the fuel system, inlet and outlet valves used with a fuel priming pump for priming the fuel system prior to starting, a one-way check valve to prevent syphoning from the fuel system back to the tank, and an air vent valve for bleeding the system of air through a vent line. The air vent valve is often manually opened before engine startup to ensure proper bleeding of air and is then closed after the engine is started.

The large number of separate valves, and the consequent large number of lines associated with the valves, often lead to difficulty in determining malfunctions in the fuel system. Service personnel must usually check out each valve and line. Such fuel systems do not lend themselves to compactness and serviceability.

BRIEF SUMMARY OF THE INVENTION

In the present invention the functions of a number of separate valves are incorporated in the use of one valve, and this is a primary object of the present invention.

In the present invention a multipurpose valve is located between an engine driven fuel transfer pump and an engine driven fuel injection pump. The valve is also connected to a fuel tank, a hand-operated priming pump and fuel filter chambers.

The multipurpose valve includes a valve body having an internal cylindrical bore. The valve body has openings which connect the bore to the fuel tank and to the priming pump and also has an outlet manifold connecting the bore through the filter chamber to the transfer pump and the fuel injection pump.

The multipurpose valve also includes a valve sleeve which is reciprocable within the bore. The valve sleeve has lands, grooves, a port extending through the sidewall of the sleeve and an end wall extending across the interior of the sleeve to block fluid flow between the extremities of the sleeve.

The valve sleeve is reciprocable between a first position and a second position during priming. In the first position fuel is drawn from the fuel tank to the interior of the sleeve through the port. In the second position the fuel is pumped from the interior of the sleeve through the port to the outlet manifold. In the second position of the sleeve an annular groove in the outer periphery of the sleeve also connects the outlet manifold to a vent line to vent air from the outlet manifold and the filter chambers.

The sleeve is shifted to a third position during operation of the engine to regulate the output pressure of the transfer pump by bypassing fuel from the outlet manifold to the inlet of the transfer pump during engine operation. A spring between one end of the bore and the sleeve regulates the pressure at which fuel is bypassed from the transfer pump.

A second spring between the other end of the bore and the valve sleeve serves as a preload to return the valve sleeve to a fourth position during shutdown of the engine. In the fourth position the valve sleeve blocks the openings in the valve body from the fuel tank and the priming pump and also closes off the outlet manifold.

The valve sleeve also includes a number of small, axially spaced, annular grooves in the outer periphery which provide continuously controlled air bleed of the outlet manifold during normal engine operation.

A multipurpose valve constructed as described above and effective to function in a manner described above constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
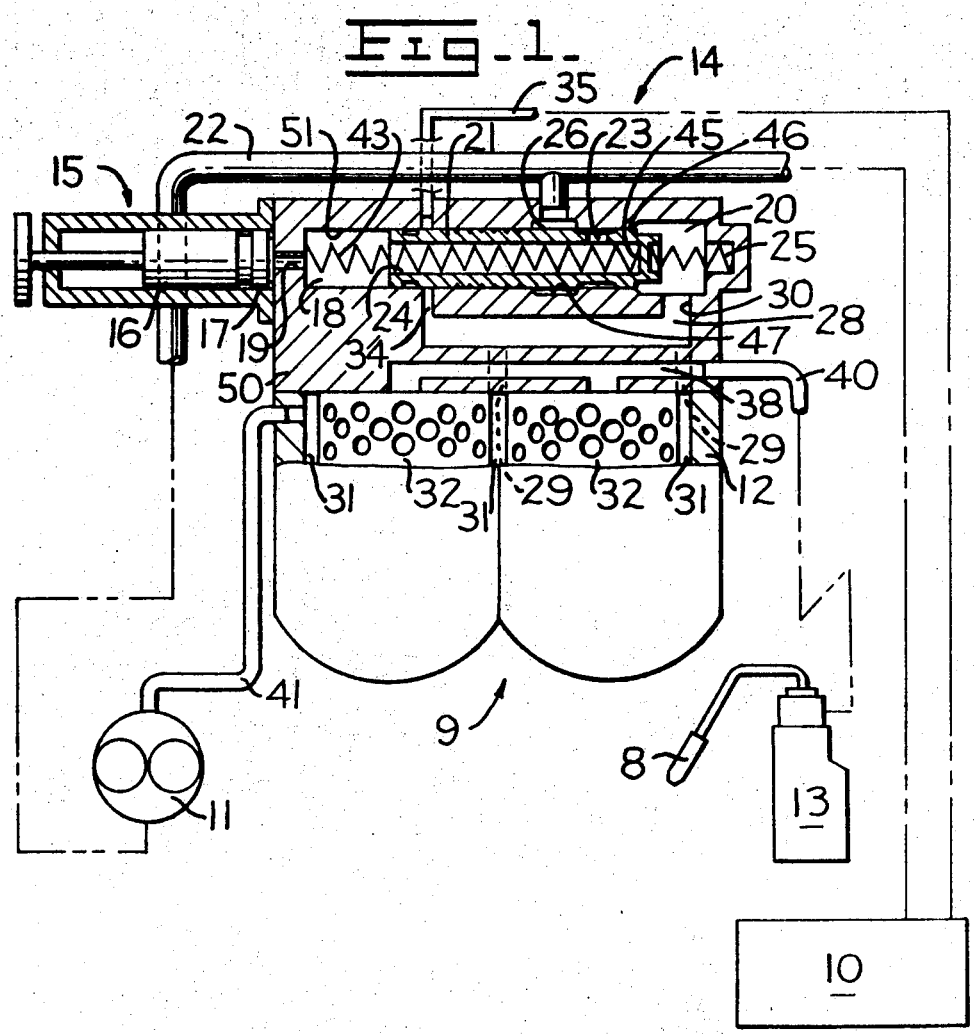
FIG. 1 is a cross section in side elevation through a multipurpose valve constructed in accordance with one embodiment of the present invention.

In FIG. 1 an engine fuel system, indicated generally by the reference numeral 9, incorporates a multipurpose valve 14 constructed in accordance with one embodiment of the present invention.

The fuel system 9 includes a fuel tank 10, an engine driven transfer pump 11 and an engine driven injection pump 13.

The fuel injection pump 13 is connected to an injection nozzle 8.

The multipurpose valve 14 includes a valve body 50 formed with an internal cylindrical bore 51.

A valve sleeve 21 is reciprocable within the bore 51.

A filter housing 12 is directly attached to the valve body 50.

A priming pump 15 is also attached directly to valve body 50. The priming pump 15 includes a hand-operated plunger 16. The plunger 16 includes a sliding seal 17.

A chamber 18 is formed between one end of the bore 51 and the valve sleeve 21. A passageway 19 connects the chamber 18 to the priming pump 15.

A chamber 20 is formed between the other end of the bore 51 and the valve sleeve 21.

A wall 45, extending across the interior of the sleeve 21, divides the chamber 20 from the chamber 18.

A fuel line 22 extends from the fuel tank to an opening 47, in the form of an annular groove, in the valve body. The line 22 also extends to the inlet of the engine driven transfer pump 11.

A line 41 connects the outlet of the transfer pump to a chamber 31 in the interior of the filter housing 12. A manifold 38 and a line 40 connect the filter chamber 31 to the fuel injection pump 13.

Filters 32 are located in the chamber 31.

An outlet manifold 28 is connected to the chamber 20 by a passage 30.

The outlet manifold 28 is also connected to the chamber 31 by a passageway 29.

A vent passage 34 connects the manifold 28 to a vent line 35. The vent line 35 is preferably connected, as shown, back to the fuel tank.

A port 23 extends through the side of the sleeve 21 to connect an annular groove 27, in the outer periphery of the sleeve, with an internal bore 24 within the sleeve.

A land 46 is formed at one side of the annular groove 27, and a land 26 is formed at the other side of the annular groove 47.

A number of small, axially spaced circumferential grooves 48 in the outer periphery of the sleeve 21 are located so that at least one is in communication between the passage 34 and the vent line 35 whenever the valve sleeve 21 is in the position assumed during normal operation of the engine. This position of the valve sleeve will be described in greater detail below in the description of the operation of the valve 14 in the fuel system 9.

An annular groove 36 provides communication between the passageway 34 and the vent line 35 during another condition of operation which will also be described in detail below.

A spring 25 is located between one end of the bore 51 and the valve sleeve 21.

A spring 43 is located between the other end of the bore 51 and the valve sleeve 21.

Figure 2:
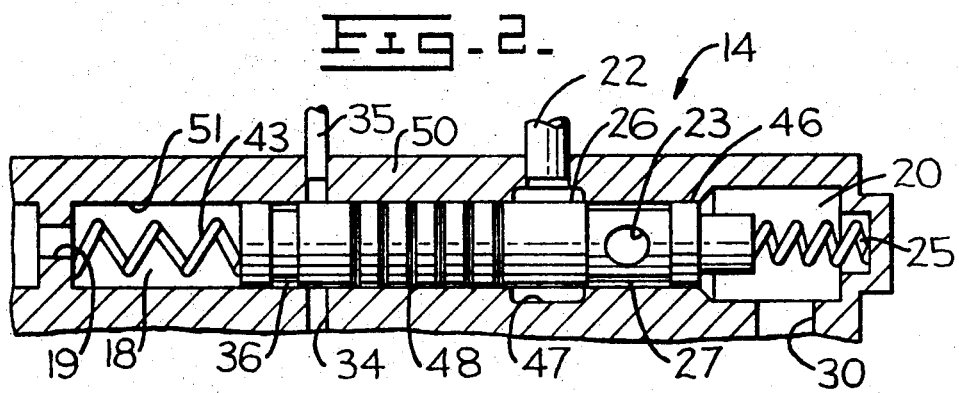
FIG. 2 is an enlarged view of the valve bore and valve sleeve shown in FIG. 1.

In FIG. 1 and FIG. 2 the valve sleeve 21 is shown in the position assumed during shutdown of the engine. In this position the lands of the valve sleeve 21 close off the openings to the vent line 35, the passageway 19, the annular groove 47 and communication between the bore 24 of the sleeve and the chamber 20.

In the priming operation, the plunger 16 is drawn to the left as viewed in FIG. 1. This creates a negative pressure in the chamber 18 because of the communication with the priming pump through the passage 19 in the valve body. The higher relative pressure in the chamber 20 forces the valve sleeve 21 in a leftward direction. This exposes the the fuel line 22 to the negative pressure through the port 23 and bore 24 of the valve sleeve 21. This causes the fuel and/or air to be drawn from the tank 10 into the bore 24 and the chamber 18.

The plunger 16 is then moved to the right. This tends to compress the fuel and/or air in the chamber 18 and in the bore 24. This increase in the pressure forces the valve sleeve 21 to the right against the preload force of the spring 25. The land 26 of the valve sleeve 21 blocks the fuel line 22. The annular groove 27 is exposed to the chamber 20. This permits fuel within the chamber 18 to escape to the outlet manifold 28 through the port 23 and the outlet passage 30.

This pumping action, in which the valve sleeve is moved from the first position described above (in which the port 23 communicates with the fuel line 22 and the chamber 18) to the second position described above (in which the port 23 communicates with the chamber 20 and the chamber 18), fills the filter chambers 31 with fuel and/or air. The filter chambers are in communication with the outlet manifold 28 through the passageways 29. Any air in the chambers 31 is displaced by the influx of fuel. The air escapes through the manifold 28 to the passage way 34 and to the vent line 35 through the annular groove 36 of the valve sleeve 21 when the valve sleeve is in its rightward or second position as described above in the priming operation.

The fuel from the chambers 31 flows through the filters 32 to the passage 38 and line 40 and to the injection pump 13.

When a pressure of approximately 10 p.s.i. is built up within the fuel filter housing 12, the engine is prepared to start. The engine driven transfer pump 11 then draws fuel from the tank 10 through the line 22 and delivers the fuel to the chamber 31 through line 41.

If the fuel pressure in the chambers 31 exceeds a predetermined amount, as determined by the spring 43, the valve sleeve 21 is moved to the left as viewed in FIG. 1, because of the fuel pressure in chamber 20, until the land 46 of the valve 21 exposes the annular groove 47 in the valve body 50. This permits the escape of fuel from the chamber 20 to the line 22. The line 22 returns the fuel to the inlet of the transfer pump 11. The spring 43 thus controls the outlet pressure of the transfer pump 11 in this third position of the valve sleeve 21. The valve sleeve 21 will assume this position while the engine is operating.

The circumferential grooves 48, as noted above, are placed so as at least one of these grooves is in communication between the passage 34 and the vent line 35 whenever the valve sleeve 21 is in this third, operating position.

Thus, in accordance with the present invention, the multipurpose valve 14 simplifies the valving arrangement and improves the fuel system serviceability. The valve is first utilized as a priming mechanism. The valve also permits bleeding of the system when filling. During engine operation, the valve functions as a bypass in controlling system pressure while still providing continuously controlled air bleeding by the use of small grooves on the valve body.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A multipurpose valve for a fuel system of the kind in which an engine driven transfer pump transfers fuel from a fuel tank to a fuel injection pump during engine operation and a hand priming pump is associated with the transfer pump to fill the system for startup, said multipurpose valve comprising a valve body having an internal bore formed with openings for connection to the fuel tank, transfer pump, and priming pump and an outlet to the injection pump, and a valve sleeve reciprocable within the bore and having land, groove, port and wall means positioned with respect to said openings and said outlet in the valve body to draw fuel from the tank into a first chamber in the body in a first position of the sleeve with respect to the body during the intake stroke of the priming pump, to pump the fuel from said chamber to the outlet to the injection pump in a second position of the sleeve with respect to the body during the output stroke of the priming pump, and to regulate the output pressure of the transfer pump by bypassing fuel from said outlet back to the inlet of the transfer pump in a third position of the sleeve with respect to the body during operation of the engine.

2. A multipurpose valve as defined in claim 1 including first resilient means between the valve body and the valve sleeve effective to determine the level of the output pressure of the transfer pump in said third position of the valve sleeve.

3. A multipurpose valve as defined in claim 2 including second resilient means between the valve body and the valve sleeve acting in opposition to said first resilient means and effective to locate the sleeve in a fourth position with respect to the valve body in which the valve sleeve closes off said openings and said outlet during shutdown of the engine.

4. A multipurpose valve as defined in claim 1 wherein the groove means include a plurality of small, axially spaced grooves in the outer periphery of the sleeve for insuring continuous, controlled venting of said outlet to an opening to the fuel tank in the third position of the valve sleeve.

5. A multipurpose valve as defined in claim 1 wherein the groove means include a first annular groove in the outer periphery of the sleeve, the wall means include an end wall extending across the interior of the sleeve to prevent fluid flow between the extremities of the sleeve and wherein the port means include a port extending through the side of the sleeve and communicating with the first annular groove for transferring fuel into and out of the interior of the sleeve in the first and second positions of the sleeve.

6. A multipurpose valve as defined in claim 5 wherein the groove means include a second annular groove in the outer periphery of the sleeve for venting air from the outlet in the second position of the sleeve.

7. A multipurpose valve as defined in claim 6 wherein the valve body has a priming pump connected directly to the valve body.

8. A multipurpose valve as defined in claim 1 wherein the valve body has filter chambers connected directly to the valve body and in fluid flow communication with outlet.

* * * * *